April 12, 1932. O. MUELLER 1,853,740
AIRCRAFT COURSE CALCULATOR
Filed Oct. 12, 1929
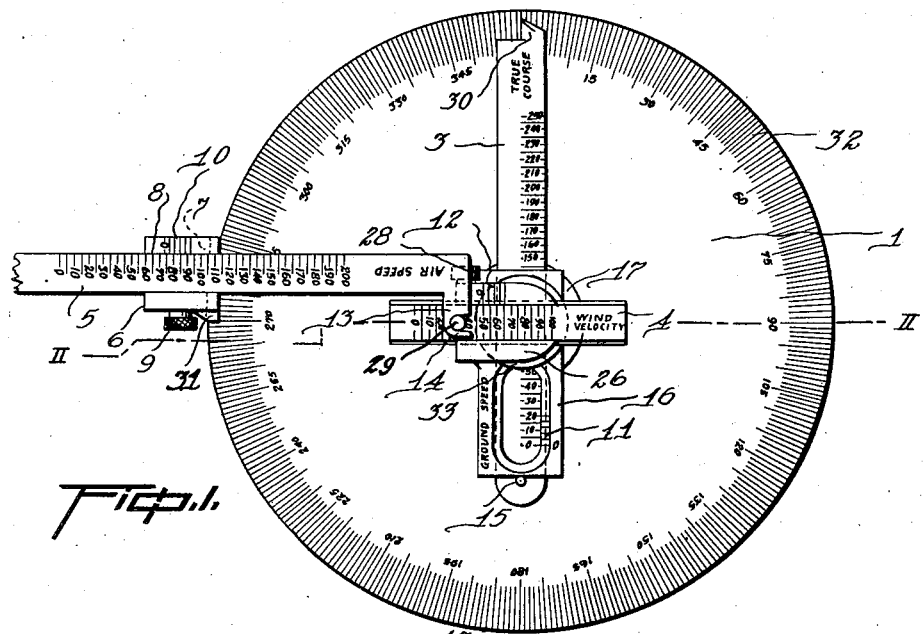
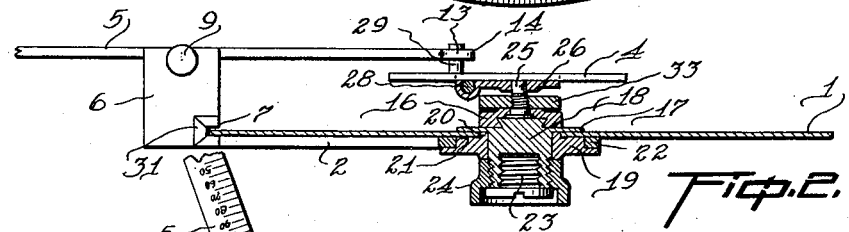
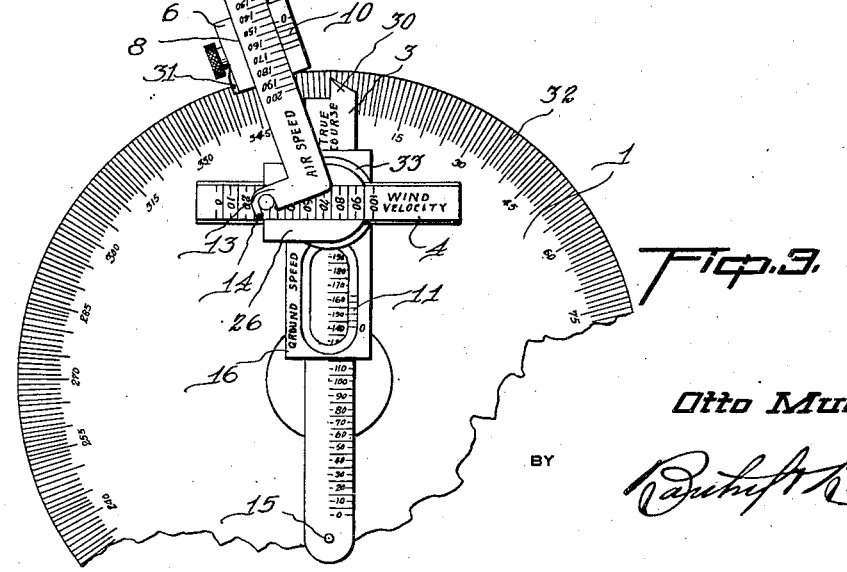
INVENTOR
Otto Mueller
BY
ATTORNEYS Patented Apr. 12, 1932

1,853,740

UNITED STATES PATENT OFFICE

OTTO MUELLER, OF DETROIT, MICHIGAN

AIRCRAFT COURSE CALCULATOR

Application filed October 12, 1929. Serial No. 399,168.

This invention relates to an instrument for mechanically calculating the unknown factors in problems of aerial navigation with reference to the correction of courses due to variations caused by the wind.

When the wind is in a direction other than the direction of the true course, the aeroplane is being acted on by two forces in two diverse directions. The course actually travelled will differ from the steering course, due to the drift or set caused by the wind, and the steering course must be directed to compensate for such drift or set.

The necessary course correction may be determined by the instrument disclosed herein without reference to charts or diagrams, by a simple manipulation of the arms of my device.

The factors involved in the computation are the speed and steering course of the aeroplane, the true course or the course to be made good, being the direction between the starting point and the point of destination, and the time required to make this true course, and the direction and velocity of the wind. Given any four of these factors, the other two can be mechanically found by a simple manipulation of my device. In all there are twelve combinations of four factors out of the total of six that can be worked out by this device. By way of example and illustration, several of these will be referred to. Given the air speed, the true course or the course to be made good and the direction and the velocity of the wind, the air navigator can mechanically ascertain the drift angle or steering course and the ground speed. Given the direction of the course to be made good and the ground speed, and the direction and velocity of the wind, the air navigator can mechanically discover the air speed and the steering course required. Given the ground speed, the direction and velocity of the wind, and the air speed, the air navigator can mechanically find the true course and the steering course.

By ground speed is meant the time required to cover the distance between the point of starting and the point of destination, and by the steering course is meant the compass course shown in the aeroplane according to its head.

With reference to the drawings;

Figure 1 is a plan view showing the point of the air speed arm to locate the given direction of the wind velocity arm;

Fig. 2 is a vertical section on the line II—II of Fig. 1; and

Fig. 3 is another plan view showing the arms in position to give the result.

Reference to these views will now be had by use of like characters which are employed to designate corresponding parts throughout.

1 is a disk graduated on its edge into degrees 32. 2 (Fig. 2) is an arm rotatably mounted in the center of the disk on the center plate 19 by means of the eye or ring 22. At the outer end of the arm 2 is an upwardly projecting head 6 provided on its inner longitudinal face with a transverse slot 7 to engage the disk, and provided on its upper face with a slot 8 parallel with the arm 2 and adapted to slidably engage the indicator arm 5. The head is also provided with a set screw 9 by which the indicator arm 5 may be fixed in position, and with a vernier 10. It is also provided with a pointer 31 at its lower inside edge. The indicator arm at its inner extremity is provided with a cross arm 13, which cross arm has at its free end a hook 14 open towards the center of the disk.

3 is another arm pivoted at the center of the disk and movable across its upper surface, having a clearance plate 17 and a downwardly depending hollow pivot 18, which hollow pivot is at its extremity, threaded internally and externally. The centering plate 19 is provided with a flanged collar 20 adapted to engage a circular opening in the disk and to receive the hollow pivot 18. A screw bolt 23 is threaded into the hollow pivot and a locking screw 24 is threaded onto the hollow pivot 18. The centering plate 19 is provided also with a concentric shoulder 21 that is slightly higher than the thickness of the ring 22 in order to allow the ring to swing freely around said concentric shoulder 21 when the arm 3 is locked in position by means of the locking screw 24. The arm 3 is provided with a pointer 30 at its outer end and is provided with a stop pin 15 at its opposite extremity.

An arm 4 is rotatably mounted by means of the slotted head 26 and the flanged headed pin 25 on the slider 16. The pin 25 is screw threaded between its two extremities to engage the milled locking screw nut 33. The slider 16 is adapted to slidably engage the arm 3. The slotted head 26 is provided with a cam lock screw 28 to fix the arm 4 in position and constitutes a swivel carriage for the arm 4. The arm 4 slidably engages the slotted head 26 and has a pin 29 adapted to engage the hook 14. The slider 16 is provided with a vernier 11 and the head 26 is provided with a vernier 12.

To determine the steering course to reach a point due north when the air speed of the aeroplane is 150 miles per hour, flying in a wind due west having a velocity of 50 miles per hour, the arm 3 or true course arm is fixed in position at 360° by a turn of the locking screw 24. The slider 16 is placed in contact with the pin 15 and the arm 4 is rotated or the wind velocity arm is fixed on a line passing through the center of the disk at 270°. This may be done by means of the indicator for the air speed arm as shown in Figure 1. The air speed is then fixed at 150 miles per hour as shown in Figure 3, and the slider moved up along the true course arm 3 after the wind velocity arm 4 has been set in the direction designated at 50 miles per hour, until the pin 29 engages the hook 14. In that position the direction of the air speed arm 2 as determined by the pointer 31 gives the steering course along which the plane must be headed to arrive at the destination due north, and the time made over the distance between the starting point and the point of destination is given by the reading on the true course arm as designated by the slider 16.

The instrument is designed so that there is a line on each arm or in parallel relation with each arm to pass through the center of the disk. Each arm is equicalibrated. The length of each of the lines represented by the arms is determined and fixed by the distance the slider is moved from the zero mark. When at zero the lines have no length and all arms coincide exactly at zero. In the instrument shown in the drawings, the air speed arm passes over the under surface of the disk and its length is determined by the indicator arm carried by the head 6. The line represented by this arm is that passing through the pointer 31 and the hook 14 to the center of the disk.

When the wind velocity arm is at zero, the air speed arm in direction and velocity will always coincide with the velocity and direction of the true course arm, and when there is wind but in the direction of the true course arm, the ground speed is the only variable and is accelerated or retarded to the extent of the velocity of the wind accordingly as the wind is a tail wind or a head wind, the direction of the true course and the steering course remaining unaltered. The direction of the wind velocity arm is always set with the slider at zero after the true course arm is set in the direction of the course to be made good with the zero end of the wind velocity arm in the direction from which the wind is blowing. The wind velocity arm is arranged to be moved into engagement with the air speed arm without disturbing the angle between it and the true course arm. However it may be moved, it must be always parallel with its direction when fixed.

The other two arms must be arranged to intersect with a point around which they both can pivot, the length of the arms represents the velocity while their position on the face of the disk represents their direction.

When fixed in position to find the result all arms must intersect and one arm must be movable into engaging position with the others in parallel relationship with its line as initially fixed. The arms, when they all intersect and interengage, represent a drift triangle composed of the two components and the resultant of a parallelogram of forces. The length of the true course arm as determined by the slider 16 is the distance made good on the true course during the same unit of time required to travel the distance set on the air speed arm.

Although a specific embodiment of the invention has been illustrated and described, it will be understood that various alterations in the details of construction may be made without departing from the scope of the invention as indicated by the appended claims.

What I claim is:

1. A calculating instrument for aerial navigation comprising a pair of arms pivoted at a point common to both, a circular base plate in a plane between said pair of arms and centered at said common pivot point, length indicating means for each of said arms slidable longitudinally thereof, a swivel carriage on the slidable means for the arm above the base plate, and a third arm slidably engaged by said swivel carriage and engaging means between one of said length arms and said third arm.

2. A calculating instrument for aerial navigation comprising a pair of arms pivoted at a point common to both, a circular base plate in a plane between said pair of arms and centered at said common pivot point, a secondary arm slidably mounted above the base plate on the arm of said pair below the base plate, a slider on the other arm of said pair, a swivel carriage on said slider, and a third arm slidable on said swivel carriage and engaging means between the secondary and third arms.

3. A calculating instrument for aerial navigation comprising a pair of arms pivoted at a point common to both, a circular base plate in a plane between said pair of arms and centered at said common pivot point, an arm slidably mounted on the arm of said pair that is below the base plate, said slidably mounted arm being in a plane above the base plate and in a transverse plane to one side of the transverse plane in which the said arm of said pair is positioned, engaging means on said slidably mounted arm laterally projecting therefrom to intersect a line parallel to said slidably mounted arm and passing through said common pivot point, a slider on the other of said pair of arms, a swivel carriage on said slider, a third arm slidably mounted on said swivel carriage and means on said third arm adapted to be engaged by the said laterally projecting engaging means.

In testimony whereof I affix my signature.

OTTO MUELLER.